United States Patent [19]

Knapp

[11] 3,955,598
[45] May 11, 1976

[54] DISTRIBUTING MEMBER HAVING A RESILIENTLY BACKED LAMELLAR SKIRT, FOR MIXING VALVES

[76] Inventor: Alfons Knapp, Bleicherstrasse, Biberach an der Riss, Germany

[22] Filed: Apr. 15, 1974

[21] Appl. No.: 461,099

[30] Foreign Application Priority Data

May 11, 1973 Italy .................................. 68343/73

[52] U.S. Cl. ..................... 137/625.41; 137/625.17; 251/182; 251/317
[51] Int. Cl.² ..................... F16K 11/02; F16K 5/18
[58] Field of Search....... 137/625.17, 625.4, 625.41, 137/636.2; 251/181, 182, 183, 192, 309, 314, 316, 317, 357

[56] References Cited
UNITED STATES PATENTS

| | | | |
|---|---|---|---|
| 2,800,923 | 7/1957 | Russell | 137/607 X |
| 2,836,388 | 5/1958 | Rakus | 251/182 |
| 2,864,580 | 12/1958 | LeMoine | 251/317 |
| 2,987,079 | 6/1961 | Page | 137/625.17 |
| 3,497,179 | 2/1970 | Smyers | 251/175 |
| 3,589,677 | 6/1971 | Segers | 251/357 X |
| 3,598,364 | 8/1971 | Grenier | 251/189 |

FOREIGN PATENTS OR APPLICATIONS 929,248  6/1963  United Kingdom................ 251/317

Primary Examiner—William R. Cline
Assistant Examiner—Richard Gerard
Attorney, Agent, or Firm—Young & Thompson

[57] ABSTRACT

A distribution member for mixing cocks, having the form of a lamellar skirt of an elastically yielding material cooperating with fluid passage ports, and having a backing of a compressed resilient material which exerts an elastical backing action substantially onto the whole surface of the operatively active portion of the skirt.

7 Claims, 7 Drawing Figures

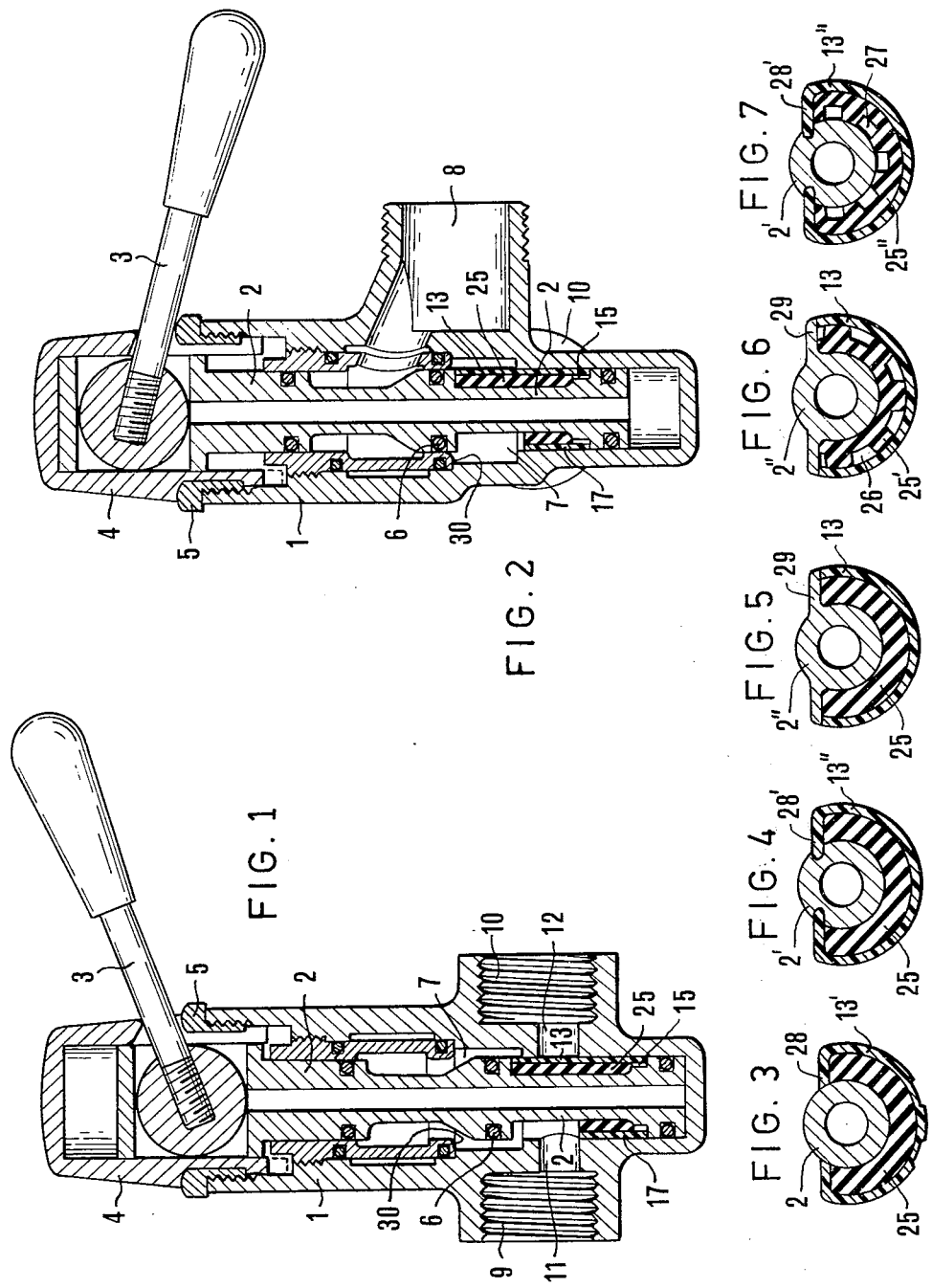

3,955,598

DISTRIBUTING MEMBER HAVING A RESILIENTLY BACKED LAMELLAR SKIRT, FOR MIXING VALVES

BACKGROUND OF THE INVENTION

The present invention relates to a distribution member for mixer cocks, flow dividers and the like, whose working part, designed to co-operate with fluid passage ports, is in the form of a lamellar skirt.

In certain types of hydraulic accessory, such as single control mixer cocks, flow dividers and the like, a rotatable and in some cases axially movable plug co-operates with fluid passage ports for adjusting the fluid flow proportions through the different ports. This is obtained by forming in the plug suitably shaped recesses which in determined positions expose the ports so enabling fluid to pass. The seal between the plug and ports must be made by gaskets of a certain complexity. Moreover the fluid passages, even when the ports are completely open, are throttled by the limited cross-section of the recesses formed in the plug, and this leads to flow rate limitation, pressure drops and noise. Finally, serious disadvantages can arise when small foreign bodies, such as particles of sand or calcareous deposits, become inserted between the plug and fluid passage ports, giving rise both to a momentary seal deficiency and damage to the parts.

BRIEF SUMMARY OF THE INVENTION

The object of the invention is to configure the distributor member, forming part of the plug or fixed to it and designed to co-operate with the fluid passage ports so as to partially or totally open and close them, in such a manner that the seal is effectively made by the distributor member itself without the aid of gaskets, and moreover this member is able to yield elastically in the presence of foreign bodies, so enabling their evacuation without causing or producing damage, and that a considerable passage cross-section for the fluid is ensured by that part of the distributor member opposite the co-operating ports, so avoiding resistance to movement and noise. To this end, according to the invention, in a distributor member for mixer taps, flow dividers or the like, designed to co-operate with fluid passage ports so as to partially or totally open them and close them, at least that part of said member which moves over the ports comprises an interrupted lamellar skirt of elastically yieldable material, connected at least one extremity to a support and control member, and between the lamellar skirt and a stem, passing within said skirt, of the respective support and control member, a compressed resilient material is arranged, to exert an elastical backing action substantially on the whole surface at least of the operatively active portion of the skirt.

The necessity, taken into account by the present invention, for the resiliently backing action to be exerted substantially on the whole active surface of the skirt, originates from the deformability of the skirt, which deformability renders inapplicable the known arrangements for pushing a deformable jacket against apertures, said arrangements contemplating the interposition of a certain number of resilient rings which exert a localized pushing action whose utilization in view of obtaining the sealing effect of the jacket with respect to the apertures requires a relatively high stiffness of the jacket itself.

Also, according to this invention the distributing member is preferably connected to the respective support and control member by means of a coupling apt to assume various positions, which allows to manufacture from standardized parts mixing valves in which the arrangement of the control members with respect to the apertures is realized in various manners.

BRIEF DESCRIPTION OF THE DRAWING

The invention will be explained better in the following description of an illustrative and not limitative embodiment shown diagrammatically, together with some variants, in the accompanying drawing, wherein:

FIG. 1 is an axial and diametral sectional elevation of a single-control mixing valve, the section being made through the inlet ducts for the liquids to be mixed, FIG. 2 is a similar sectional elevation made through the delivery duct, with the control member of the valve in a different position, and FIGS. from 3 to 7 are enlarged cross-sectional views of various possible forms of the lamellar skirt and its resilient backing element.

DETAILED DESCRIPTION OF THE PREFERRED EMBODIMENTS

The mixing valve shown in FIGS. 1 and 2 comprises a body 1 in which a plug 2 is mounted which is axially movable and rotatable and whose rotation and axial translation movements are controlled by means of a lever 3 pivoted in a rotatable but axially non-movable hood 4 mounted on the body 1 by means of a ring 5. The plug 2 is provided with a gasket 6 arranged to cooperate with a seating 30, disposed in the body 1, in order to intercept the fluid and regulate its flow.

The body 1 is formed with an outlet duct 8 which communicates with the inner chamber 7 of the body 1 when the gasket 6 is in its opening position. The body is also provided with inlet ducts 9 and 10 which communicate through openings 11 and 12 with the inner chamber 7 under the control of the distributing member shaped as an interrupted lamellar skirt 13 extending in the region corresponding to the apertures 11 and 12 by an angle which is sufficient to allow, through rotation of the plug 2, the opening of one aperture and the closing of the other, or vice versa, as well as all the intermediate conditions of regulation. Said interrupted lamellar skirt is made of an elastically yielding material, such as a suitable synthetic material, preferably of the type which is subject to cold flow, and has such dimensions as to remain elastically pressed against the inner cavity of the body 1, into which open the apertures 11 and 12, such as to establish a seal around said apertures without requiring the use of gaskets. The skirt 13 is relatively thin and has a limited stiffness in order to adapt itself in the best possible way to the surface with which it has to establish a sealing, but in consequence of this the skirt is not in a position to maintain the sealing effect against the pressure exerted by the incoming flow. In order to maintain the sealing effect in spite of that, between the skirt 13 and the portion of plug 2 which passes in its interior there is inserted a compressed resilient material 25 which resiliently backs the skirt 13 and holds it pressed against the inner cavity of the body 1 in the region of the apertures 11 and 12. The resilient material 25 is disposed in such a way as to exert its action onto the inner surface of the skirt 13 substantially along the whole portion of said surface to which corresponds an outer surface which is active in the sealing function. To this end, the resilient filling material 25 may fill uniformly the space between the skirt 13, 13', 13'' and the plug 2, 2', 2'', as shown in the FIGS. from 3 to 5, or it may be provided with outer recesses 26 (FIG. 6) and/or inner recesses 27 (FIG. 7), said recesses having the function of increasing the yielding capacity of the material 25, 25', 25'' respectively but having sufficiently reduced dimensions for not being prejudicial to the action by which the skirt 13, 13'' is pressed towards the outside.

In order to hold in place the material 25, 25'', the skirt 13', 13'' may be formed with small flanges 28, 28' oriented towards the plug 2, 2' and eventually engaged in it, as shown in FIGS. 3, 4 and 7, or the plug 2'' may be provided with tabs 29 for the same purpose, as shown in FIGS. 5 and 6.

For the connection between the skirt 13 and the plug 2, the skirt is provided with a collar 17 intended to enclose a seat 15 of the plug. In order to ensure joint rotation of the skirt 13 and the plug 2 it is possible to utilize a projection of the seat 15 of the plug 2, which projection engages an interruption of the collar 17, but preferably the collar 17 and the seat 15 have a toothed or prismatical configuration, so as to allow the skirt 13 to be keyed in various positions, which permits the standardization of parts of the valves which have a different relative arrangement of the control members and the inlet ports.

In case the flanges 28' or the tabs 29 are themselves in a position to ensure joint rotation engagement between the plug 2', 2'' and the skirt 13, 13'', there is of course no need to provide other arrangements for the same purpose.

The outer surface of the skirt 13' may advantageously be lightened, in its non operative region, by means of recesses, as shown in FIG. 3, in order to reduce the contact surface, where such surface is not necessary, and consequently reduce the friction during manipulation.

The resilient material may be, for example, soft rubber, soft synthetic material or a synthetic material softened by means of a spongy or cellular structure. It may be utilized under the form of a molded piece having the required shape or a piece of a flat laminate cut to the desired shape and wound in the space between the skirt 13 and the plug 2.

Obviously, the embodiments described herein and represented in the drawings are to be considered as illustrative only and not restrictive, as the invention is susceptible to receive somewhat different forms according to the requirements of the various applications thereof.

Having thus described my invention, what I claim is:

1. A distributing member for mixing valves having inlet ports, comprising a support and control member, a peripherally interrupted flexible lamellar skirt made of a resiliently yielding material, said flexible lamellar skirt being connected at least at one end to said support and control member and extending around said support and control member, and being intended to cooperate with the inlet ports of the valve to open and close said inlet ports according to the position of said support and control member, and between said lamellar skirt and said support and control member a compressed resilient material, extending substantially the entire extent of said lamellar skirt, whereby a resilient backing action is exerted substantially onto the whole surface at least of that portion of the skirt which is active in cooperating with said inlet ports, said support and control member having a seat, said lamellar skirt having at one end a collar that encloses said seat, and the mutually facing surfaces of said seat and collar having a non-circular shape forming a non-rotatable coupling, whereby said lamellar skirt can be mounted onto said control member in different positions always being prevented from rotating with respect to said control member.

2. A distributing member as set forth in claim 1, wherein said skirt has inwardly directed end flanges which enclose said compressed resilient material in order to hold the same in place.

3. A distributing member as set forth in claim 1, wherein said support and control member has protruding tabs which enclose said compressed resilient material in order to hold the same in place.

4. A distributing member as set forth in claim 1, wherein said lamellar skirt has recesses located in the middle region of the outer surface thereof.

5. A distributing member as set forth in claim 1, wherein said compressed resilient material has recesses in order to increase the yielding capacity thereof.

6. A distributing member as set forth in claim 1, wherein said lamellar skirt is made of a synthetic material of a type subject to the phenomenon of the so-called "cold flow".

7. A distributing member as set forth in claim 1, wherein said compressed resilient material is selected from the group of materials comprising soft rubber, soft materials, materials made soft by a spongy structure and materials made soft by a cellular structure.

* * * * *